(12) United States Patent
Shen (10) Patent No.: US 8,265,480 B2
(45) Date of Patent: Sep. 11, 2012

(54) LIGHT MARK, METHOD AND DEVICE FOR LIGHT MARK MODULATION AND DEMODULATION

(75) Inventor: Shuqiang Shen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 502 days.

(21) Appl. No.: 12/495,035

(22) Filed: Jun. 30, 2009

(65) Prior Publication Data

US 2009/0263125 A1 Oct. 22, 2009

Related U.S. Application Data

(63) Continuation of application No. PCT/CN2008/071376, filed on Jun. 20, 2008.

(30) Foreign Application Priority Data

Jun. 20, 2007 (CN) .......................... 2007 1 0117634

(51) Int. Cl.
*H04B 10/06* (2006.01)
(52) U.S. Cl. .......................................... 398/32; 398/202
(58) Field of Classification Search .................... 398/202
See application file for complete search history.

(56) References Cited

U.S. PATENT DOCUMENTS

| | | | |
|---|---|---|---|
| 6,424,439 B1 | 7/2002 | King | |
| 7,418,212 B1 * | 8/2008 | Bontu | ............................ 398/202 |
| 2006/0291870 A1 | 12/2006 | Wan et al. | |

FOREIGN PATENT DOCUMENTS

| | | |
|---|---|---|
| CN | 1156114 C | 10/2002 |
| CN | 1377154 A | 10/2002 |
| CN | 1633104 A | 6/2005 |
| CN | 1949688 A | 4/2007 |
| JP | 2003-224528 | 8/2003 |

OTHER PUBLICATIONS

International Search Report from P.R. China in International Application No. PCT/CN2008/071376 mailed Oct. 9, 2008.
Extended European Search Report dated (mailed) Jul. 21, 2010, issued in related Application No. 08757785.4-1237/2157713, PCT/CN2008071376, filed Jun. 20, 2008, Hauwei Technologies Co., Ltd.
English translation of Written Opinion of the International Searching Authority, issued by the State Intellectual Property Office, P.R. China, mailed Oct. 9, 2008, in the PCT/CN2008/071376, 4 pages.
First Chinese Office Action in Chinese Application No. 200710117634.5 and English translation, 14 pages.

\* cited by examiner

*Primary Examiner* — Danny Leung
(74) *Attorney, Agent, or Firm* — Finnegan, Henderson, Farabow, Garrett & Dunner LLP

(57) ABSTRACT

A light mark, a method and a device for light mark modulation and demodulation are disclosed. The modulation method includes: generating a mark with periodically alternating frequency and interval; and modulating the mark signal onto an optical signal. In the present disclosure, the mark with periodically alternating frequency and interval is adapted to distinguish different wavelengths by using different frequencies, and distinguish the same wavelength from different nodes by using the same frequency but different intervals. Therefore, numerous available marks are obtained with a small number of frequencies, and unique marks for all wavelengths in a network only require a number of frequencies equal to the number of the wavelengths in the network. Moreover, even if a wavelength conflict occurs, the wavelength conflict can be determined according to detected marks.

6 Claims, 8 Drawing Sheets

Node A

Node B

LIGHT MARK, METHOD AND DEVICE FOR LIGHT MARK MODULATION AND DEMODULATION

CROSS-REFERENCE TO RELATED APPLICATION

This application is a continuation of International Patent Application No. PCT/CN2008/071376, filed Jun. 20, 2008, and entitled "LIGHT MARK, METHOD AND DEVICE FOR LIGHT MARK MODULATION AND DEMODULATION," which claims the benefit of priority to Chinese Patent Application No. 200710117634.5, filed on Jun. 20, 2007, and entitled "LIGHT MARK, METHOD AND DEVICE FOR LIGHT MARK MODULATION AND DEMODULATION", both of which are incorporated herein by reference in their entireties.

FIELD OF THE DISCLOSURE

The present disclosure relates to the field of communication technology, and more particularly to a light mark, a method and a device for light mark modulation and demodulation.

BACKGROUND OF THE DISCLOSURE

Figure 1:
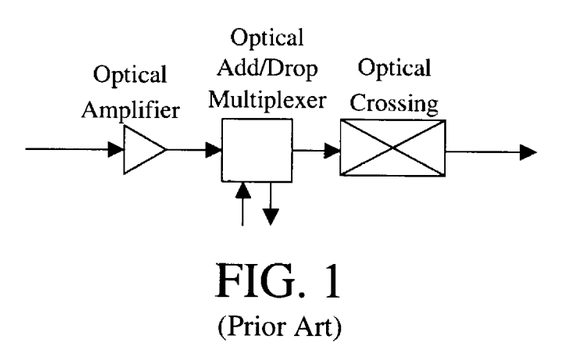
FIG. 1 is a schematic view of all-optical transport nodes of the prior art.

With the development of optical transport technologies, optical transport networks develop towards configurable all-optical networks, and network topologies develop towards MESH networks, so the network size becomes larger and larger. FIG. 1 is a schematic view of all-optical transport nodes. As wavelength channels are transmitted in a network in an all-optical manner, path information cannot be obtained by extracting the path overhead through photoelectric conversion at an intermediate node. Therefore, it is difficult to identify optical fiber connection relation, trace and performance of wavelength path, and the like.

In order to solve the above problem, an optical wavelength tracking technique is proposed. In this technique, a low-frequency mark signal is modulated onto each wavelength, and an intermediate node in a transmission link demodulates the mark signal to obtain the optical fiber connection relation as well as the transmission trace and transmission performance of the wavelength path.

Figure 2:
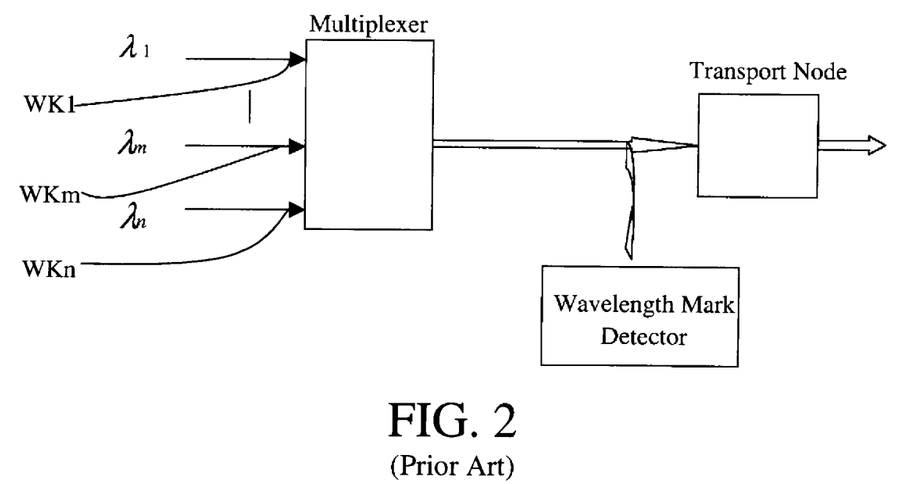
FIG. 2 is a schematic view of a wavelength tracking technique of the prior art.

As shown in FIG. 2, a wavelength transmitting end modulates a unique wavelength mark WK for each wavelength path by using a fixed pilot tone modulation depth m. A small portion of light is split off from the main optical path at a transparent node, then photoelectrically converted, and electrically processed to obtain a wavelength mark. A wavelength at the node and the performance of the wavelength path are analyzed according to the wavelength mark, so that the transmission trace and transmission performance of the optical wavelength path in the all-optical network are obtained, thus facilitating the management and maintenance of the all-optical network. In order to realize a low-cost light marking technique, a method for photoelectrically converting signals in the main optical path and then extracting each mark signal in the electrical domain is generally adopted, instead of adopting an expensive optical filter to separate each wavelength path in the optical domain and then extracting marks through photoelectric conversion. Thereby, the marks are intermingled together after photoelectric conversion, so that each mark needs to have certain properties to facilitate a mark detection device to separate the marks. As single-frequency signals have good properties in this regard, if signals of different frequencies are used as different marks, each mark may be distinguished and identified at a detection end by using a fast Fourier transform (FFT) or finite impulse response (FIR) filter. Frequency marks are simple and easily detected, and thus widely applied in the industry.

In order to identify all channel paths in the network, it needs to modulate a mark that is unique in the whole network for each wavelength at each upload node. To achieve the purpose of enabling the marks to penetrate network components without requiring a complex demodulation device, sinusoidal signals in a frequency range of tens of K to 1 M are generally adopted. Moreover, in order to easily distinguish different marks, a certain frequency interval between adjacent marks is needed. As a result, available frequency marks become very limited, and the above marks are far from being sufficient for a large-scale network.

Therefore, a solution for expanding the number of available marks must be provided to meet the requirement of tracking wavelength paths in transparent networks.

Figure 3:
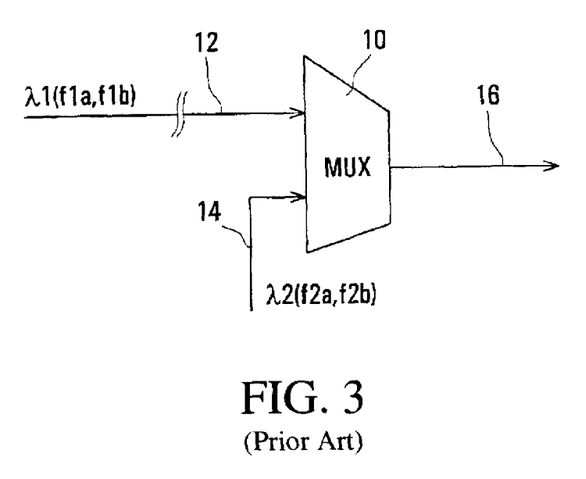
FIG. 3 is a schematic view of a light mark in a technical solution of the prior art.

In order to solve the above problem, a solution for expanding the number of marks through frequency combination is currently proposed in the industry. As shown in FIG. 3, for example, 1600 frequencies are available, and a network that needs to be marked is a 40-wavelength network. Firstly, a frequency subset of 1600/40=40 frequencies is assigned to each wavelength. Then, marks for the same wavelength from different nodes employ different frequency combinations in the frequency subset. The frequency combination may be a combination of two or more frequencies. As different wavelengths adopt combinations in different frequency sets as marks, the detection end determines the wavelengths that have been received by the node according to the detected frequencies of the marks, and distinguishes the same wavelength in the network according to the frequency combinations in each frequency set, thus expanding the number of the marks.

In the process of implementing the present disclosure, the inventor found that the above technical solution in the prior art at least has the following problems.

1) Although the number of frequencies required by the unique mark for each upload wavelength in the network may be reduced by frequency combination, as the number of frequencies required by a current large-scale and high density network is still very huge, this method cannot meet the requirement of the network.

2) Under the condition of a fixed available frequency range, in order to increase the number of available frequencies, the frequency interval between adjacent available frequencies must be reduced. In order to avoid interference between adjacent frequencies, the frequency generator is required to have a higher frequency stability, which increases hardware requirements of the mark modulation end. Meanwhile, as the frequency interval between the marks is reduced, the difficulty in demodulation is increased, no matter the demodulation device employs the FFT demodulation scheme or the FIR filtering scheme.

For example, the frequency of each mark is obtained by using the FFT transform. At this time, as the frequency interval is reduced, the result of the FFT transform is required to have a higher frequency resolution. Thereby, at the same sampling rate, more nodes need to be FFT transformed, which increases the difficulty in transformation. Meanwhile, as the frequency interval between the marks is reduced, the interference between frequencies of adjacent marks becomes greater during the demodulation, so that interference frequencies are easily produced, and correct amplitudes of the frequencies of the marks cannot be easily obtained. As a result, the performance of the light marking technique is degraded.

3) When a wavelength conflict occurs, the conflict may not be correctly detected, and instead, an error determination is easily made.

It is assumed that a combination of two frequencies is used as a mark for each wavelength in the network, and the same wavelength enters the same mark detection device due to a fault in the network. At this time, if two marks have the same frequency but opposite phases, the frequency will be cancelled, so that the frequency combination detected by the mark detection device is different from the original one. In this case, an error mark set is detected, the connection relation cannot be determined according to the corresponding relation of the marks at each detection point, and the wavelength conflict also cannot be detected.

In the industry, another technical solution is provided in the prior art.

Figure 4:
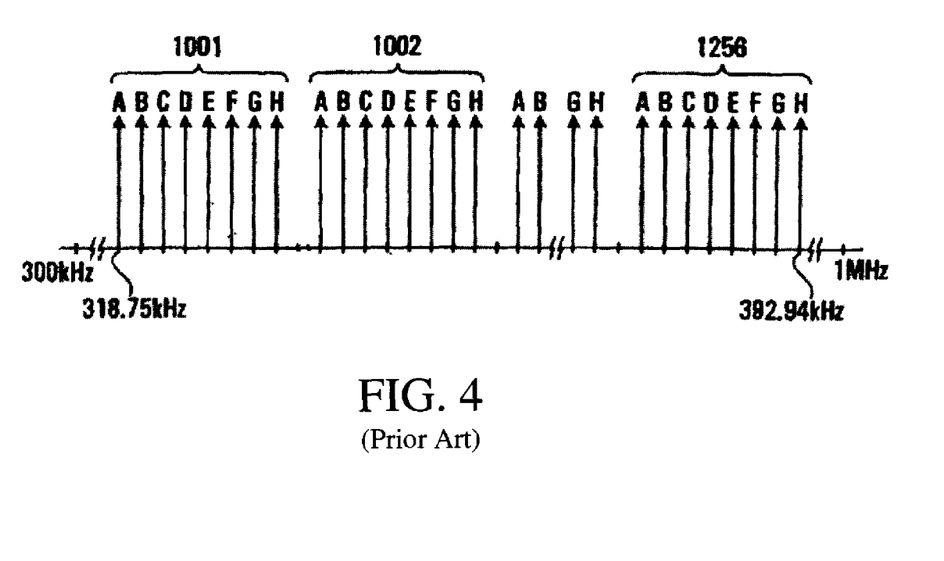
FIG. 4 is a schematic view of a light mark in another technical solution of the prior art.

Firstly, data to be transmitted is frequency shift keying (FSK) modulated and serves as a light mark. Then, the light mark signal is modulated onto an optical signal through amplitude modulation. Mark data of different wavelengths are FSK modulated with frequencies of different ranges. As shown in FIG. 4, for a first wavelength, eight frequencies in a range b 1001 are used for FSK modulation; for a second wavelength, eight frequencies in a range 1002 are used for FSK modulation, and the rest is implemented in the same way.

As different FSK modulation frequencies are used for different wavelengths, a frequency sequence on each wavelength is easily distinguished and obtained when the mark signals are continuously detected. Data information delivered by each wavelength mark can be obtained by decoding the frequency sequence. The data information may carry a wavelength, a source node, and other information. In this way, traces of all wavelengths in the network can be obtained.

In the process of implementing the present disclosure, it was found that the above technical solution in the prior art at least has the following problems.

1. Each wavelength still needs more than two frequencies. The solution adopted in the industry is to modulate the mark data by 8-ary frequency shift keying (8FSK), so that each wavelength needs eight frequencies, which is still a large number.

2. In case of a wavelength conflict, the data may be confused after demodulation, and the conflict cannot be easily determined.

SUMMARY OF THE DISCLOSURE

Accordingly, the present disclosure is directed to a light mark, a method and a device for light mark modulation and demodulation, so as to solve the problem that the number of frequencies required by a light mark is too large and the existence of wavelength conflict.

The present disclosure is achieved through the following technical solutions.

A light mark is provided. The light mark includes a frequency portion and an interval, and the frequency portion and the interval appear in a periodically alternating manner.

A method for light mark modulation is provided. The method includes the following steps.

A mark with periodically alternating frequency and interval is generated. Then, the mark signal is modulated onto an optical signal.

Another method for light mark modulation is also provided. The method includes the following steps.

Firstly, different carrier frequencies are assigned to different wavelengths.

Then, amplitude shift keying (ASK) modulation is performed on the carrier frequencies to generate marks each including a frequency and an interval, and the marks are corresponding to the wavelengths.

Finally, the marks are modulated onto optical signals of the corresponding wavelengths.

A device for light mark modulation is provided. The device includes a processor, a direct digital synthesizer (DDS), and a light modulator.

The processor is adapted to control the DDS to generate a mark with periodically alternating frequency and interval, and control an amplification level of the mark.

The DDS is connected to the processor, and controlled by the processor to generate the mark with periodically alternating frequency and interval.

The light modulator is connected to the processor, and adapted to receive the mark generated by the processor and modulate the mark onto an optical signal.

A method for light mark demodulation is provided. The method includes the following steps.

First, an optical signal modulated with a mark including a frequency and an interval is photoelectrically converted into an electrical signal, and the electrical signal is converted into a digital signal. The digital signal is then sampled to obtain a frequency, a counter is controlled to count according to a sampling result, and a particular mark is determined according to the frequency and a counting result of the counter.

A device for light mark demodulation is provided. The device includes a signal receiving circuit and a digital processor.

The signal receiving circuit is adapted to photoelectrically convert an optical signal modulated with a mark including a frequency and an interval into an electrical signal, and convert the electrical signal into a digital signal.

The digital processor is connected to the signal receiving circuit, and adapted to receive the digital signal output by the signal receiving circuit, and obtain a particular mark by demodulating the digital signal.

It can be seen from the above technical solutions provided by the present disclosure that the mark with periodically alternating frequency and interval is adapted to distinguish different wavelengths by using different frequencies, and distinguish the same wavelength from different nodes by using the same frequency but different intervals. Therefore, the following efficacies are achieved.

1) Numerous available marks are obtained with a small number of frequencies, and unique marks for all wavelengths in a network only require a number of frequencies equal to the number of the wavelengths in the network.

2) As the number of required frequencies is greatly reduced, the demand for the mark modulation hardware is lowered, and the difficulty in mark demodulation is reduced, thus improving the demodulation performance.

3) Even if a wavelength conflict occurs, the wavelength conflict can be determined according to detected marks.

4) As discontinuous mark frequencies are adopted, the interference between the marks with different wavelengths is reduced, and the power consumption of the mark modulation device is also lowered.

BRIEF DESCRIPTION OF THE DRAWINGS

The present disclosure will become better understood from the detailed description given herein below for illustration only by referring to the accompanying drawings, among which.

DETAILED DESCRIPTION OF THE EMBODIMENTS

The technical solutions of the present disclosure will be clearly and fully described below with reference to the accompanying drawings. It is obvious that the embodiments to be described are only a part rather than all of the embodiments of the present disclosure. All other embodiments derived by those skilled in the art based on the embodiments of the present disclosure should fall within the scope of the present disclosure.

In the present disclosure, the mark with periodically alternating frequency and interval is adapted to distinguish different wavelengths by using different frequencies, in which the frequency interval may be the same or different, and distinguish the same wavelength from different nodes by using the same frequency but different intervals.

Figure 5:
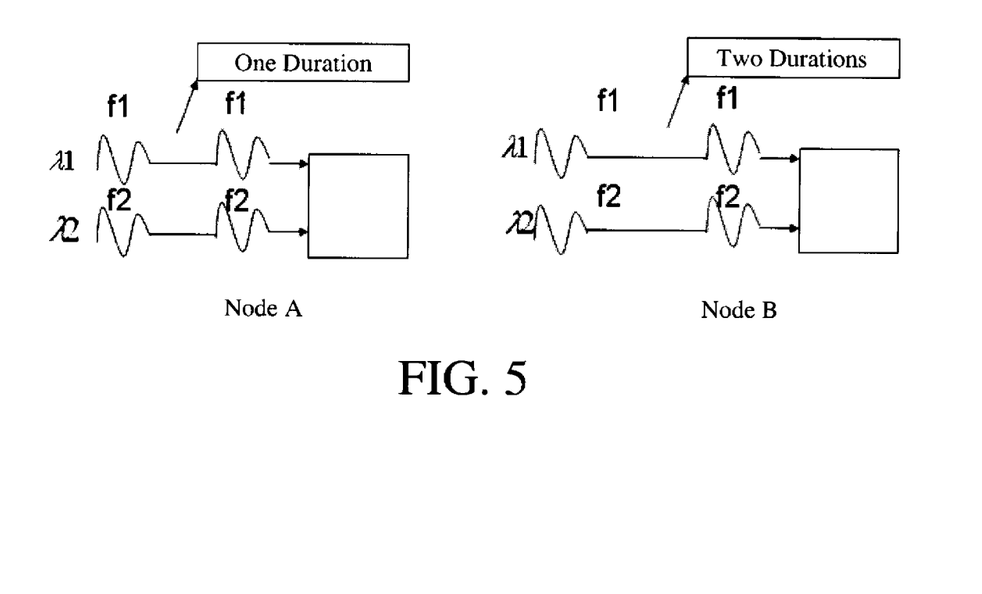
FIG. 5 is a schematic view of frequency marks of Nodes A and B according to an embodiment of the present disclosure.

FIG. 5 is a schematic view of frequency marks of Nodes A and B. For Nodes A and B, the same wavelength f1 is marked by using the same frequency λ1 but different intervals. For the wavelength f1, Node A adopts one duration as an interval; while Node B adopts two durations as an interval. Different wavelengths f1 and f2 from Node A are marked with different frequencies, that is, the wavelength f1 is marked with the frequency λ1, and the wavelength f2 is marked with a frequency λ2. The two wavelengths may have the same interval, which is one duration, and may also have different intervals.

Figure 6:
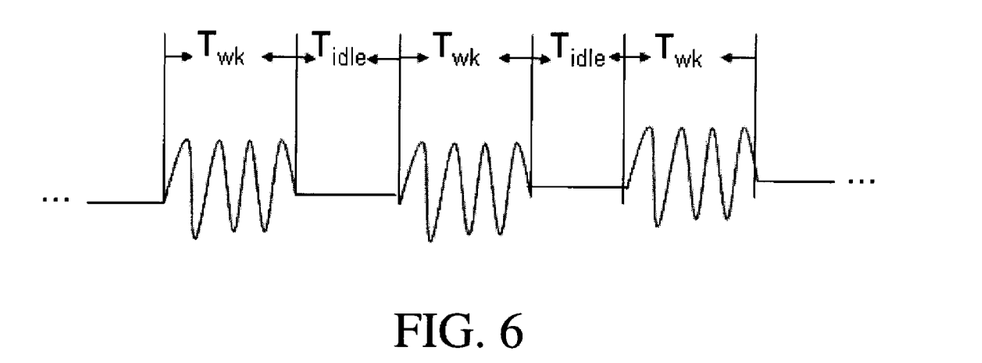
FIG. 6 is a schematic view of a mark with periodically alternating frequency and interval according to an embodiment of the present disclosure.

FIG. 6 is a schematic view of a mark with periodically alternating frequency and interval according to an embodiment of the present disclosure. The frequency portion is donated by $T_{wk}$, and the interval is donated by $T_{idle}$.

The method and device for light mark modulation are described in detail below with reference to different embodiments and the accompanying drawings.

Figure 7:
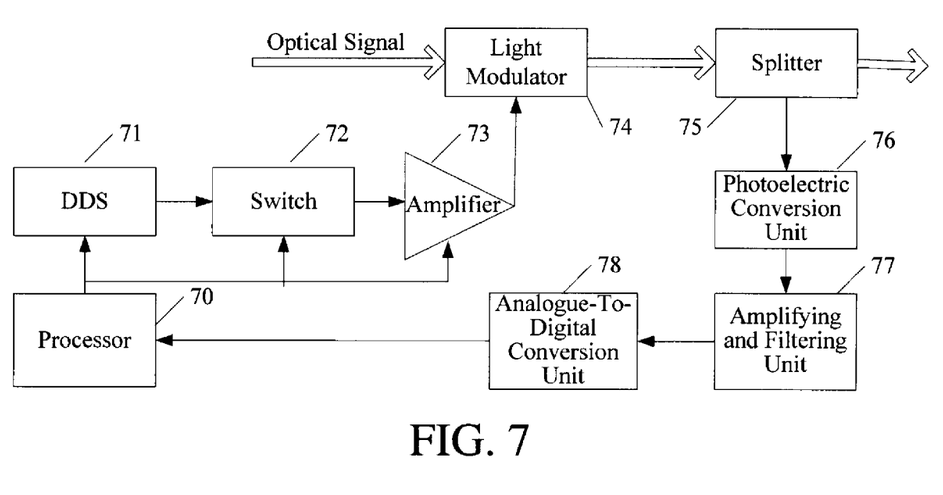
FIG. 7 is a schematic view of a device for light mark modulation according to a first embodiment of the present disclosure.

FIG. 7 is a schematic structural view of a device for light mark modulation according to a first embodiment of the present disclosure. Referring to FIG. 7, the device includes a processor 70, a Direct Digital Synthesizer (DDS) 71, a switch 72, an amplifier 73, and a light modulator 74.

The processor is adapted to control the DDS 71 to generate a frequency mark, and control an amplification level of the frequency mark, so as to make the frequency mark meet the requirement.

The DDS 71 is connected to the processor 70, and controlled by the processor 70 to generate a corresponding frequency mark.

The switch 72 is connected to the processor 70 and the DDS 71, and controlled by the processor 70 to be turned on or off, so as to generate a mark with periodically alternating frequency and interval.

The amplifier 73, connected to the switch 72 and the processor 70, is adapted to receive the mark with periodically alternating frequency and interval, and controlled by the processor 70 to amplify the mark with periodically alternating frequency and interval. The amplifier 73 may be a variable gain amplifier, and is an optional unit.

The light modulator 74 is connected to the amplifier 73, and adapted to receive the mark amplified by the amplifier 73 and modulate the mark signal onto an optical signal.

Here, the processor 70 controls the DDS 71 to generate the mark with periodically alternating frequency and interval by controlling the on/off of the switch 72, which is merely an embodiment of the present disclosure and the disclosure is not limited thereto. Any solution capable of generating the mark with periodically alternating frequency and interval shall fall within the scope of the disclosure. For example, in practice, the processor 70 may also directly control the DDS 71 to generate the mark with periodically alternating frequency and interval.

In order to prevent normal services from being affected during the marking of signals and meanwhile detect a corresponding mark signal at the detection end, the amplitude of the mark signal needs to be controlled in the processor 70. In an embodiment of the present disclosure, a feedback circuit is provided. The feedback circuit, connected between the light modulator 74 and the processor 70, is adapted to split off a portion of light from the optical signal modulated with the mark, and feed back the portion of light to the processor 70, so as to facilitate the processor 70 to adjust the amplitude according to feedback information. As shown in FIG. 7, the feedback circuit includes a splitter 75, a photoelectric conversion unit 76, an amplifying and filtering unit 77, and an analogue-to-digital conversion unit 78.

The splitter 75 is adapted to split off a small portion of light from an optical signal modulated with a frequency mark.

The photoelectric conversion unit 76 is connected to the splitter 75, and adapted to receive the split light and photoelectrically convert the optical signal into an electrical signal.

The amplifying and filtering unit 77 is connected to the photoelectric conversion unit 76, and adapted to amplify and filter the electrical signal to separate an electrical signal obtained by photoelectrically converting a service signal from an electrical signal obtained by photoelectrically converting the mark, and filter off noises except the frequency mark.

The analogue-to-digital conversion unit 78 is connected to the amplifying and filtering unit 77, and adapted to perform analogue-to-digital conversion to convert the electrical signals obtained after filtering into a digital signal and transmit the digital signal to the processor 70.

Figure 8:
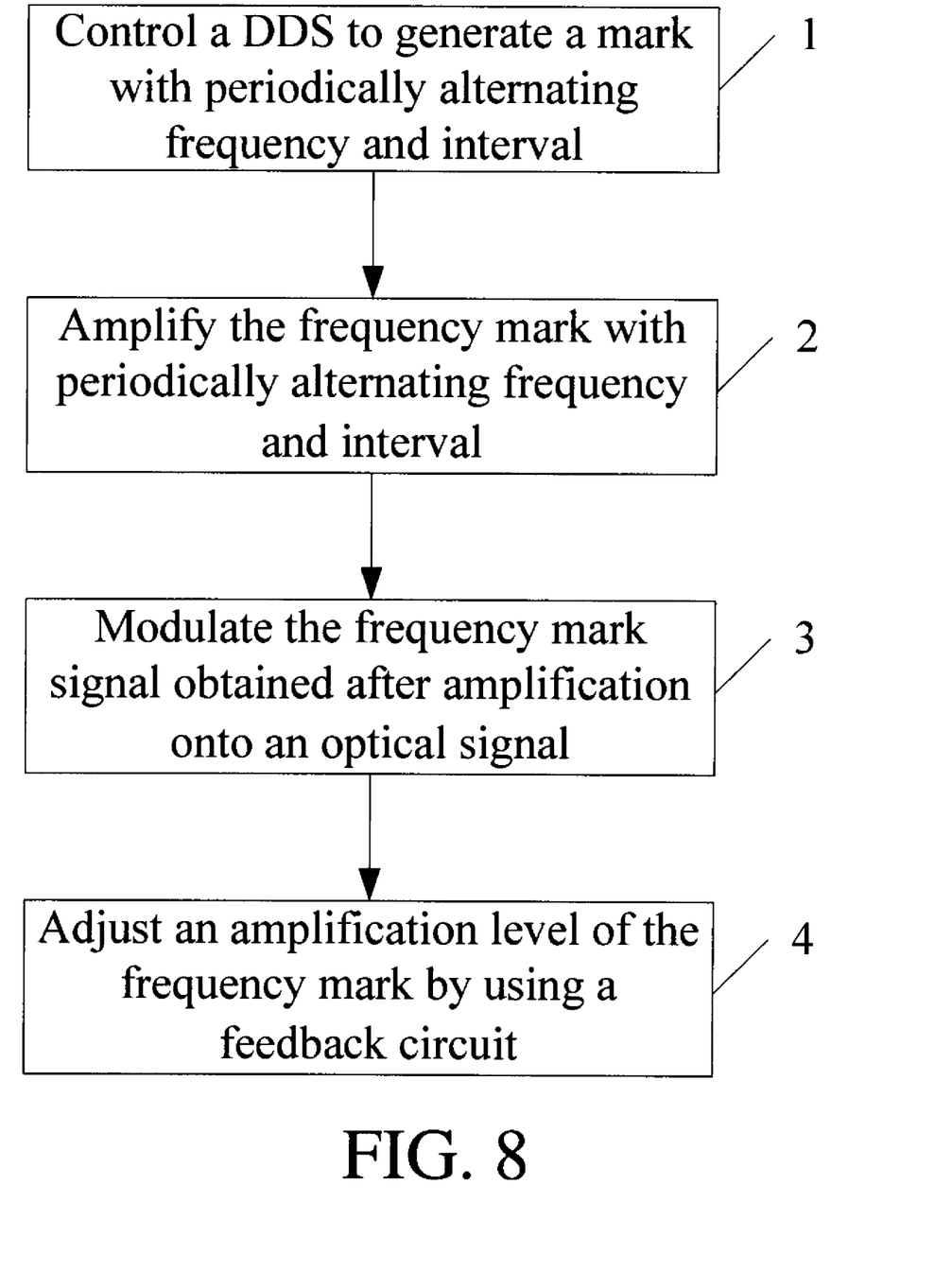
FIG. 8 is a flow chart of a method for light mark modulation according to a second embodiment of the present disclosure.

FIG. 8 is a flow chart of a method for light mark modulation according to a second embodiment of the present disclosure. Referring to FIG. 8, the method includes the following steps.

In Step 1, a DDS is controlled to generate a mark with periodically alternating frequency and interval.

The mark with periodically alternating frequency and interval may be generated by the DDS 71 under the control of a processor 70. Specifically, the processor 70 controls the DDS 71 to generate continuous frequency marks, and the processor 70 controls the frequency and the interval to appear in a periodically alternating manner by controlling the open or closed state of a circuit; or the processor controls the DDS 71 to directly generate the mark with periodically alternating frequency and interval.

In Step 2, the frequency mark with periodically alternating frequency and interval is amplified.

In Step 3, the frequency mark signal obtained after amplification is modulated onto an optical signal.

In order to prevent normal services from being affected and meanwhile detect a corresponding mark signal at the detection end, the method further includes the following step.

In Step 4, an amplification level of the frequency mark is adjusted by using a feedback circuit.

For example, a small portion of light is split off from the optical signal modulated with the mark. Then, the optical signal is photoelectrically converted into an electrical signal. Afterward, the electrical signal is converted into a digital signal through analogue-to-digital conversion, and the digital signal is transmitted to the processor 70. The processor 70 may adjust the amplification level of the frequency mark in Step 2 according to the digital signal.

In the solutions for marking the optical signal provided by the above two embodiments, numerous frequency marks are provided by using a small number of frequencies. As the number of required frequencies is greatly reduced, the demand for the mark modulation hardware is lowered. Moreover, as discontinuous mark frequencies are adopted, the interference between the marks with different wavelengths is reduced, and the power consumption of the mark modulation device is also lowered.

As the same wavelength from different nodes adopts marks with the same frequency but different intervals, the same wavelength from different nodes may be distinguished according to lengths of the intervals. The method and device for light mark demodulation are described in detail below with reference to different embodiments and the accompanying drawings.

Figure 9:
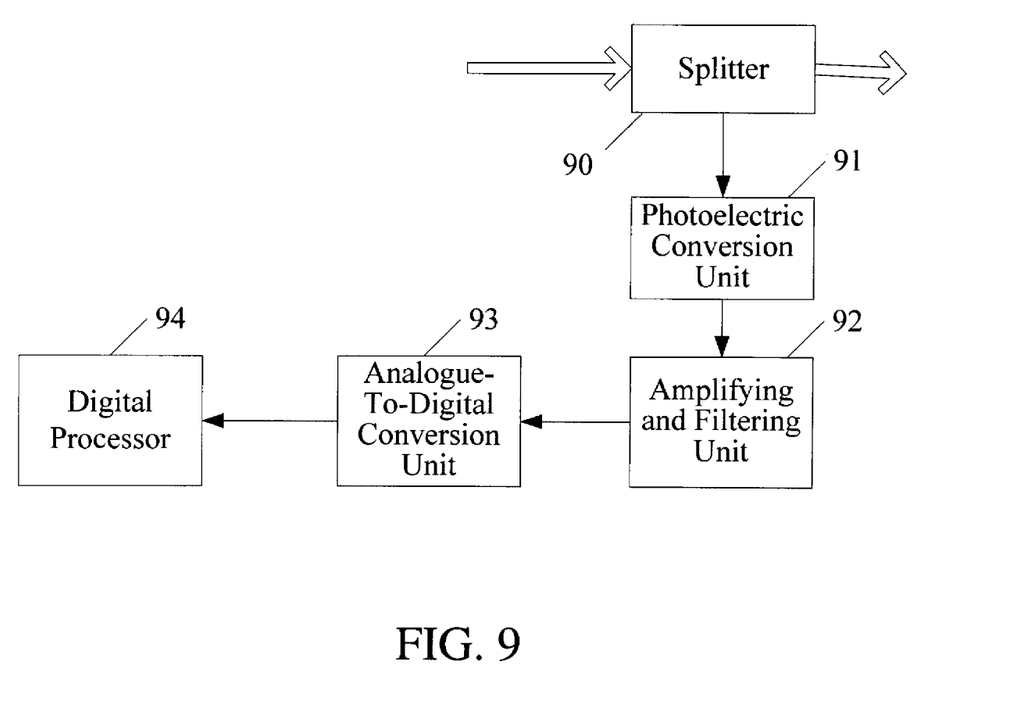
FIG. 9 is a schematic view of a device for light mark demodulation according to a third embodiment of the present disclosure.

FIG. 9 is a schematic view of a device for light mark demodulation according to a third embodiment of the present disclosure. Referring to FIG. 9, the device includes a signal receiving circuit and a digital processor 94.

The signal receiving circuit is adapted to split off a small portion of light from an optical signal modulated with a frequency mark, which is subjected to photoelectric conversion and analogue-to-digital conversion and then provided to the digital processor. The signal receiving circuit further includes a splitter 90, a photoelectric conversion unit 91, an amplifying and filtering unit 92, and an analogue-to-digital conversion unit 93.

The splitter 90 is adapted to split off a small portion of light from the optical signal modulated with the frequency mark.

The photoelectric conversion unit 91 is connected to the splitter 90, and adapted to receive the split light and photoelectrically convert the optical signal into an electrical signal.

The amplifying and filtering unit 92 is connected to the photoelectric conversion unit 91, and adapted to amplify and filter the electrical signal to separate an electrical signal obtained by photoelectrically converting a service signal from an electrical signal obtained by photoelectrically converting the mark.

The analogue-to-digital conversion unit 93 is connected to the amplifying and filtering unit 92, and adapted to perform analogue-to-digital conversion to convert the received electrical signal into a digital signal and transmit the digital signal to the digital processor 94.

The digital processor 94 is connected to the signal receiving circuit, and adapted to analyze the received digital signal to identify wavelength marks of different nodes and amplitudes of the marks.

The analysis performed by the digital processor 94 specifically includes the following steps. Firstly, data in a sampling window is FFT transformed to obtain a frequency in the sampling time (the present disclosure is not limited herein, and may also be implemented by other processing manners to obtain the frequency; and FFT transform is described as an example below). For example, if f1 exists in a transformation result, a counter is started for a mark with the frequency f1, and an initial value of the counter is set to 0. Then, an FFT transformation result of the next sampling window is checked. If f1 exists, the counter value is remained unchanged; otherwise, 1 is added to the counter. The counting is continued until f1 again exists in a transformation result of a sampling window, and at this time, the counter value is stored, and the counter is reset to 0. A mark is determined according to the counter value and the frequency f1.

Figure 10:
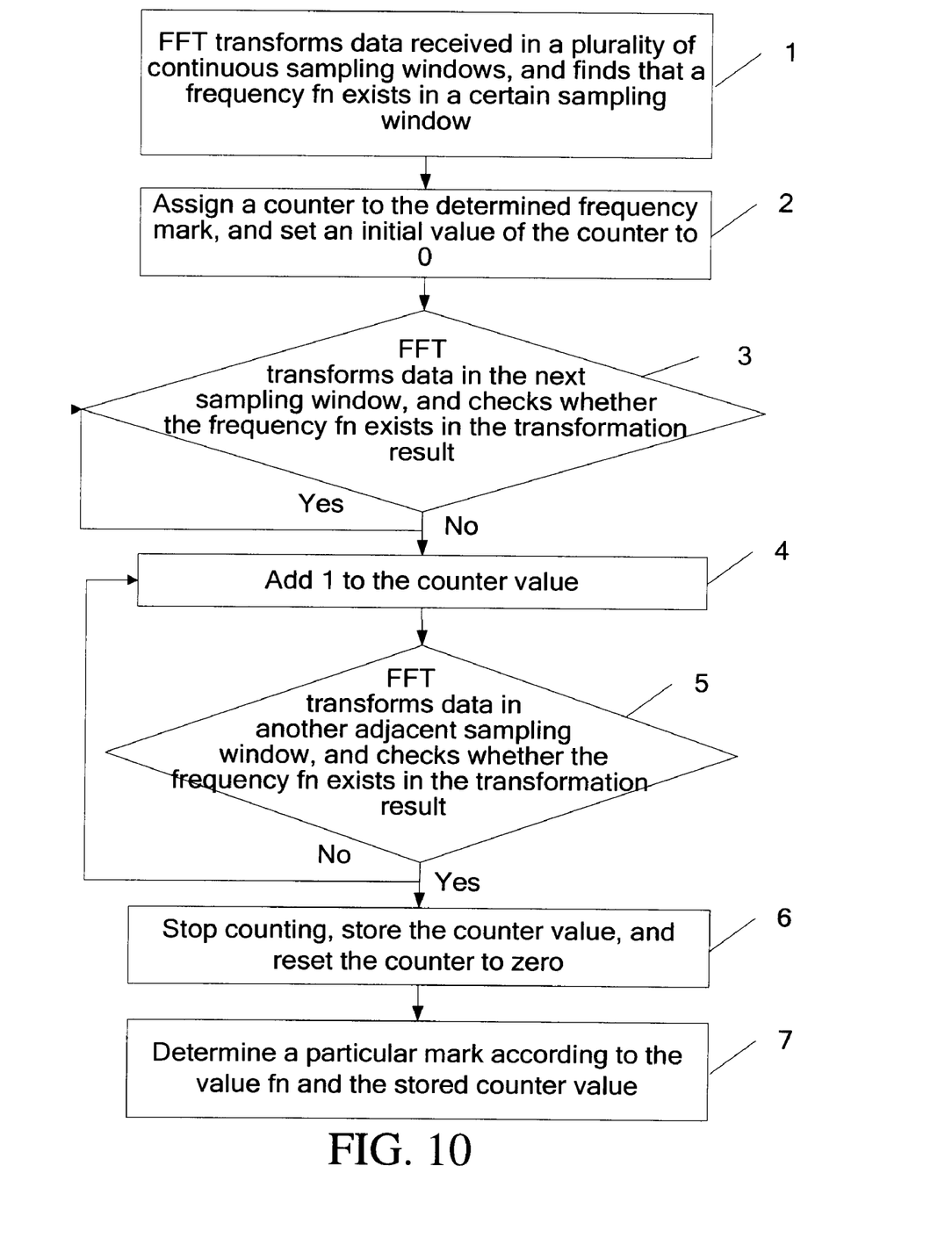
FIG. 10 is a flow chart of a method for light mark demodulation according to a fourth embodiment of the present disclosure.

FIG. 10 is a flow chart of a method for light mark demodulation according to a fourth embodiment of the present disclosure. In this embodiment, the frequency is determined to be fn, which is taken as an example for illustration only, and the process of detecting other mark frequencies is the same. Referring to FIG. 10, the method includes the following steps.

In Step 1, data received in a plurality of continuous sampling windows is FFT transformed, and it is found that a frequency fn exists in a certain sampling window.

In order to ensure that the sampling window completely falls within the frequency portion of the light mark, a duration of the frequency portion of the light mark is required to be more than twice of the size of one sampling window. In this way, it may be ensured that any frequency section of the mark signal contains at least one complete sampling window.

Figure 11:
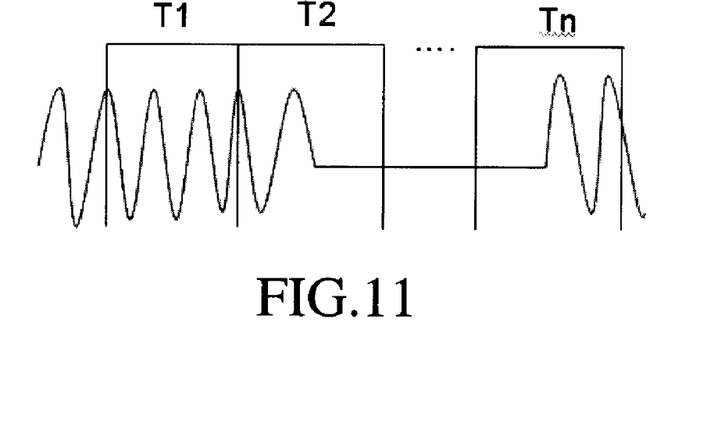
FIG. 11 is a schematic view of sampling of a mark.

As shown in FIG. 11, only when a sampling window T1 completely falls within the frequency portion of the mark, an amplitude of the mark frequency obtained by FFT transforming the data in the sampling window is the actual amplitude of the mark frequency. When only a portion of a sampling window T2 falls within the frequency portion of the mark, an amplitude of the mark frequency obtained by FFT transform is smaller than the actual amplitude. Therefore, during the demodulation, FFT transformation results of several samples where the same frequency mark continuously appears need to be compared, and a maximum value is taken as the amplitude of the frequency mark. Thus, the detection of the performance of the marked wavelength may not be affected.

In Step 2, a counter is assigned to the determined frequency mark, and an initial value of the counter is set to 0.

In Step 3, data in the next sampling window is FFT transformed, and it is checked whether the frequency fn exists in the transformation result; if yes, this step is continuously performed; otherwise, Step 4 is performed.

In Step 4, 1 is added to the counter value.

In Step 5, data in another adjacent sampling window is FFT transformed, and the transformation result is checked; if the frequency fn exists, Step 6 is performed; otherwise, Step 4 is performed.

In Step 6, the counting is stopped, the counter value is stored, and the counter is reset to 0.

In Step 7, a particular mark is determined according to the value fn and the stored counter value, and if the detection needs to be continued, Step 4 is performed to carry on the mark detection.

In order to facilitate the detection, the interval in the frequency mark is set to be equal to n times of the length of the sampling time window (n is an integer). In this way, when borders of the sampling time window and the frequency portion overlap, no frequency mark exists in n continuous sampling windows. If the sampling time window contains the frequency and interval, as shown in FIG. 11, no frequency mark exists in n−1 continuous sampling windows. In order to avoid an error caused by this case, the present disclosure provides the following two solutions.

1) The interval may be determined according to the number of sampling time windows where no mark frequency exists (the counter value) and the amplitude of the frequency mark in the sampling window T2 or the amplitude of the frequency mark in the sampling window Tn.

When borders of T2 and the frequency portion overlap, the frequency amplitude obtained by FFT transforming sampled data in T2 remains consistent with that obtained by FFT transforming sampled data in T1. If T2 contains the frequency and interval, the frequency amplitude obtained by FFT transforming sampled data in T2 will be smaller than that obtained by FFT transforming sampled data in T1. The final counter value can be modified by comparing the amplitude of the mark frequency in T2 with the amplitude of the mark frequency in T1. When the amplitude of the mark frequency in T2 is smaller than the amplitude of the mark frequency in T1, 1 is added to the final counter value. When the amplitude of the mark frequency in T2 is equal to the amplitude of the mark frequency in T1, the final counter value is equal to the counter value obtained from the process in FIG. 10.

2) A difference between intervals of frequency marks for the same wavelength from different nodes is set to be at least twice of the length of the sampling time, so as to ensure that different count values are obtained when the demodulation device counts the intervals for the same wavelength from different nodes. Thus, the count values may be adopted to distinguish nodes that the detected wavelengths are from.

The present disclosure is also applicable to cases where the length of the interval is not an integral multiple of the length of the sampling time.

As the mark cannot be determined unless the frequency portion and the interval of the mark are detected, and the frequency portion and the interval of the mark are both closely related to the length of the sampling time, the time taken for detecting the mark is depending on the length of the sampling time. The frequency resolution of FFT transform is the reciprocal of the length of the sampling time. In order to correctly distinguish different marks, the length of the sampling time is at least equal to the reciprocal of the interval of the mark. In the present disclosure, the number of frequencies required by the unique marks in the network only needs to be equal to the number of wavelengths in the network. For example, for a 40-wavelength system, unique marks for all wavelengths in the network can be realized by simply using 40 frequencies. In this way, the number of required frequencies is greatly reduced, and the interval between the frequency marks is increased in the same available frequency range, thus lowering the demand for the length of the sampling time. For example, if the interval between the frequency marks is 1K, the length of the sampling time needs to be at least 0.001 s. The duration of the frequency portion of the frequency mark is at least twice of the sampling time, and the interval is generally an integral multiple of the length of the sampling time window, so that if it is intended to support 1000 nodes to upload the same wavelength, the longest time taken for detecting the mark is (1000+2)*0.001 s*2. That is, about 2 s is required, which is desirable for the current non-real time wavelength switching network.

In the mark demodulation solutions provided by the above two embodiments of the present disclosure, the mark with periodically alternating frequency and interval is adopted. When a wavelength conflict occurs, the periodical alternation between the frequency and the interval will be destroyed, and accordingly the wavelength conflict is detected. Therefore, the mark demodulation solutions provided by the embodiments of the present disclosure are capable of detecting a wavelength conflict.

Figure 12:
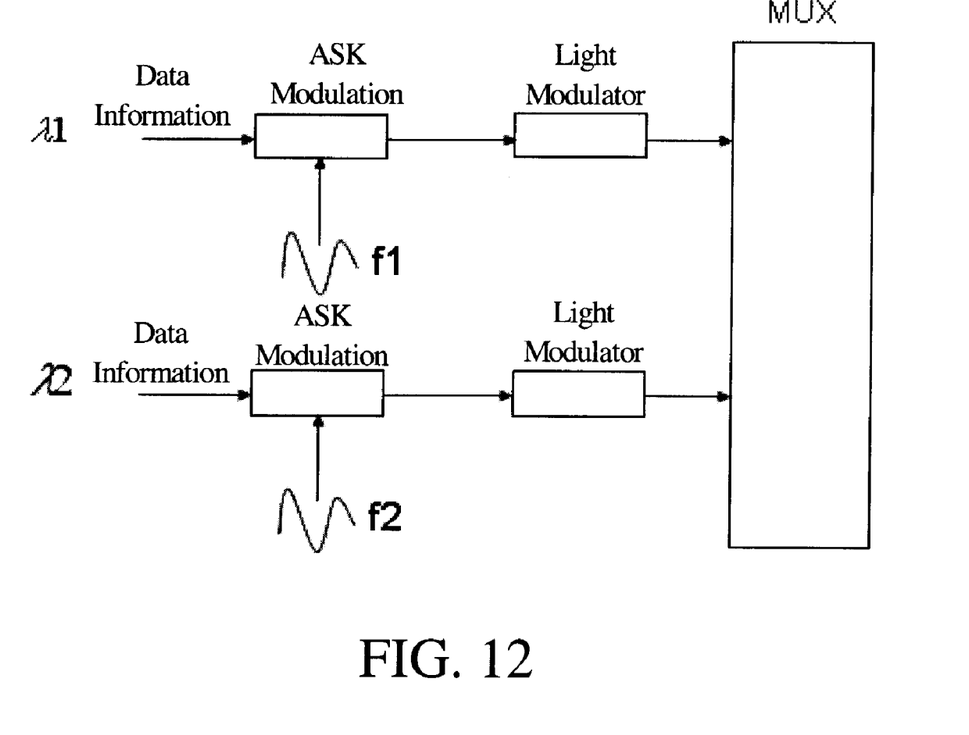
FIG. 12 is a schematic view of ASK modulation of a light mark according to an embodiment of the present disclosure.

The methods for frequency mark modulation and demodulation of the present disclosure are also applicable to a solution that data information is ASK modulated and then serves as a light mark. An embodiment of the solution is shown in FIG. 12. In this embodiment, different carrier frequencies are assigned to different wavelengths, and data information to be carried by marks is ASK modulated to generate marks each including a frequency and an interval corresponding to the wavelengths. The marks are modulated onto optical signals of the corresponding wavelengths. The marks on different wavelengths are distinguished at the receiving end according to different frequencies. Data information carried in the mark on each wavelength is obtained by using the method according to the fourth embodiment. If the corresponding frequency appears in a bit period, the data information is data 1; otherwise, the data information is data 0. In this manner, bit information sequences carried in the marks are obtained. Nodes that the wavelengths are from may be distinguished by using source node information about the wavelengths carried by the bit sequences.

To sum up, in the present disclosure, the mark with periodically alternating frequency and interval is adapted to distinguish different wavelengths by using different frequencies, and distinguish the same wavelength from different nodes by using the same frequency but different intervals. Therefore, the following efficacies are achieved.

1) Numerous available marks are obtained with a smaller number of frequencies, and unique marks for all wavelengths in a network may only require a number of frequencies equal to the number of the wavelengths in the network.

2) As the number of required frequencies is greatly reduced, the demand for the mark modulation hardware is lowered, and the difficulty in mark demodulation is reduced, thus improving the demodulation performance.

3) Even if a wavelength conflict occurs, the wavelength conflict can be determined according to detected marks s.

4) As discontinuous mark frequencies are adopted, the interference between the marks with different wavelengths is reduced, and the power consumption of the mark modulation device is also lowered.

The above embodiments are merely intended to describe and explain the principle of the present disclosure. It should be understood that the implementation manners of the present disclosure are not limited thereto. It will be apparent to those skilled in the art that various modifications and variations can be made to the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for light mark demodulation, comprising:
photoelectrically converting an optical signal modulated with a mark comprising a frequency and an interval into an electrical signal, and converting the electrical signal into a digital signal; and
sampling the digital signal to obtain the frequency, controlling a counter to count according to a sampling result, and determining a particular mark according to the frequency and a counting result of the counter;
wherein the sampling the digital signal to obtain the frequency, controlling the counter to count according to the sampling result, and determining the particular mark according to the frequency and the counting result of the counter comprises:
sampling the converted electrical signal in a time period to obtain a frequency of the electrical signal in a sampling time window according to data in the sampling time window;
assigning a counter to the frequency;
sampling in a next time window, processing sampled data to determine if a frequency equal to the frequency of the electrical signal exists in the sampling time window;
repeatedly sampling, if the frequency equal to the frequency of the electrical signal exists in the sampling window, processing sampled data to determine if a frequency equal to the frequency of the electrical signal in the sampling time window exists in the sampling time window; and
adding, if the frequency equal to the frequency of the electrical signal does not exist in the sampling time window, 1 to the counter value and performing the following:
sampling in another adjacent time window, processing sampled data to determine if a frequency is equal to the above frequency exists in the sampling time window;
repeatedly sampling, if the frequency equal to the above frequency exists in the sampling time window, processing sampled data to determine if a frequency is equal to the above frequency in the sampling time window;
adding, if the frequency equal to the above frequency does not exist in the sampling time window, 1 to the counter value and repeatedly performing this step until a frequency equal to the above frequency appears in the sampling time window;
stopping, if the frequency equal to the above frequency exists in the sampling time window, counting, storing the counter value, and resetting the counter to zero; and
determining the particular mark according to the frequency and the stored counter value.

2. The method according to claim 1, wherein a maximum value of the sampling time window is a half of a duration of the frequency portion of the mark with periodically alternating frequency and interval.

3. The method according to claim 1, wherein the determining the particular mark according to the frequency and the stored counter value comprises:
if a same frequency mark is obtained after data in a plurality of adjacent sampling windows is processed, comparing amplitudes of the frequency mark in the sampling windows, and modifying the counter value according to a comparison result; and
determining the particular mark according to the modified counter value and the frequency.

4. The method according to claim 3, wherein the modifying the counter value comprises:
adding 1 to the counter value, if the same frequency mark is obtained after data in a plurality of adjacent sampling windows in the time period is processed and amplitudes of the frequency mark are different; and
remaining the counter value unchanged, if the same frequency mark is obtained after data in the plurality of adjacent sampling windows in the time period is processed, and amplitudes of the frequency mark are identical.

5. A device for light mark demodulation, comprising:
a signal receiving circuit, adapted to photoelectrically convert an optical signal modulated with a mark comprising a frequency and an interval into an electrical signal, and convert the electrical signal into a digital signal; and
a digital processor, connected to the signal receiving circuit, and adapted to receive the digital signal output by the signal receiving circuit, and obtain a particular mark by demodulating the digital signal;
wherein the signal receiving circuit comprises:
a splitter, adapted to split off a portion of the optical signal modulated with the mark signal from the optical signal;
a photoelectric conversion unit, connected to the splitter, and adapted to receive the split optical signal and photoelectrically convert the split portion of the optical signal into an electrical signal;
an amplifying and filtering unit, connected to the photoelectric conversion unit, and adapted to amplify and filter the electrical signal to separate an electrical signal obtained by photoelectrically converting a service signal in the optical signal from an electrical signal obtained by photoelectrically converting the mark signal in the optical signal; and
an analogue-to-digital conversion unit, connected to the amplifying and filtering unit, and adapted to perform analogue-to-digital conversion to convert the electrical signal obtained by photoelectrically converting the service signal and the electrical signal obtained by photoelectrically converting the mark signal into a digital signal.

6. A device for light mark demodulation, comprising:
a signal receiving circuit, adapted to photoelectrically convert an optical signal modulated with a mark comprising a frequency and an interval into an electrical signal, and convert the electrical signal into a digital signal;
a digital processor, connected to the signal receiving circuit, and adapted to receive the digital signal output by the signal receiving circuit, and obtain a particular mark by demodulating the digital signal;
wherein the digital processor comprises a sampling unit and a counter, and
wherein the sampling unit is adapted to:
sample data in a sampling window,
assign a counter if a sampling result indicates that the frequency exists,
sample in a next time window, process sampled data to determine if a frequency equal to the above frequency exists in the sampling time window,
repeatedly sample, if the frequency equal to the above frequency exists in the sampling time window, process sampled data to determine if a frequency equal to the above frequency exists in the sampling time window, if the frequency equal to the above frequency does not exist in the sampling time window, add 1 to the counter value and perform the following:
  sampling in another adjacent time window, processing sampled data to determine if a frequency equal to the above frequency exists in the sampling time window,
  adding, if the frequency equal to the above frequency does not exist in the sampling time window, 1 to the counter value and repeatedly performing this step until a frequency equal to the above frequency appears in the sampling time window,
stopping counting, if the frequency equal to the above frequency exists in the sampling window, storing the counter value, and resetting the counter to zero; and
determining the particular mark according to the frequency and the stored counter value.

\* \* \* \* \*

UNITED STATES PATENT AND TRADEMARK OFFICE
CERTIFICATE OF CORRECTION

PATENT NO. : 8,265,480 B2  
APPLICATION NO. : 12/495035  
DATED : September 11, 2012  
INVENTOR(S) : Shuqiang Shen Page 1 of 1

It is certified that error appears in the above-identified patent and that said Letters Patent is hereby corrected as shown below:

In claim 6, column 13, line 9, "1to" should read --1 to--

Signed and Sealed this  
Twenty-sixth Day of February, 2013

Teresa Stanek Rea  
*Acting Director of the United States Patent and Trademark Office*